(12) United States Patent
Fang et al.

(10) Patent No.: US 11,198,177 B2
(45) Date of Patent: Dec. 14, 2021

(54) METHODS AND SYSTEMS FOR 3D PRINTING WITH POWDERS

(71) Applicant: University of Utah Research Foundation, Salt Lake City, UT (US)

(72) Inventors: Zhigang Zak Fang, Salt Lake City, UT (US); Pei Sun, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 16/644,928

(22) PCT Filed: Sep. 5, 2018

(86) PCT No.: PCT/US2018/049587
§ 371 (c)(1),
(2) Date: Mar. 5, 2020

(87) PCT Pub. No.: WO2019/050973
PCT Pub. Date: Mar. 14, 2019

(65) Prior Publication Data
US 2020/0282461 A1 Sep. 10, 2020

Related U.S. Application Data

(60) Provisional application No. 62/554,257, filed on Sep. 5, 2017.

(51) Int. Cl.
*B22F 3/115* (2006.01)
*B22F 1/00* (2006.01)
(Continued)

(52) U.S. Cl.
CPC ............ *B22F 3/115* (2013.01); *B22F 1/0059* (2013.01); *B22F 3/1028* (2013.01); *B22F 12/00* (2021.01);
(Continued)

(58) Field of Classification Search
CPC ...... B22F 3/115; B22F 1/0059; B22F 3/1028; B22F 3/1055; B22F 2003/1056;
(Continued)

(56) References Cited

U.S. PATENT DOCUMENTS

| 4,035,342 A | 7/1977 | Paschke |
| 4,389,559 A | 6/1983 | Rotolico et al. |

(Continued)

FOREIGN PATENT DOCUMENTS

| WO | WO-2011057615 A1 * | 5/2011 | ............ B05B 15/18 |
| WO | WO2016/198291 | 12/2016 | |

(Continued)

OTHER PUBLICATIONS

Villafuerte ("Considering cold spray for additive manufacturing." Advanced Materials & Processes 50 (2014): 50-52.) (Year: 2014).*
(Continued)

*Primary Examiner* — Steven J Bos
*Assistant Examiner* — Ricardo D Morales
(74) *Attorney, Agent, or Firm* — Thorpe North & Western

(57) ABSTRACT

A method of printing a three dimensional article (201) can include forming a bottom layer of the three dimensional article (201) by spraying a dry build material powder (210) onto a build platform (230) while heating the dry build material powder (210). The dry build material powder (210) can include metal or ceramic particles mixed with a polymeric binder having a softening point temperature. The dry build material powder (210) can be heated to a temperature above the softening point temperature such that the dry build material powder (210) adheres to the build platform (230). Subsequent layers can be formed by spraying dry build material powder (210) onto a lower layer while heating the dry build material powder (210) such that the dry build material powder (210) adheres to the lower layer.

10 Claims, 6 Drawing Sheets

(51) Int. Cl.
*B22F 3/10* (2006.01)
*B28B 1/00* (2006.01)
*B22F 12/00* (2021.01)
*B33Y 10/00* (2015.01)
*B33Y 30/00* (2015.01)
*B22F 10/10* (2021.01)

(52) U.S. Cl.
CPC .............. *B28B 1/001* (2013.01); *B22F 10/10* (2021.01); *B22F 2201/02* (2013.01); *B22F 2201/11* (2013.01); *B22F 2201/50* (2013.01); *B33Y 10/00* (2014.12); *B33Y 30/00* (2014.12)

(58) Field of Classification Search
CPC .............. B22F 2201/02; B22F 2201/11; B22F 2201/50; B28B 1/001; B33Y 10/00; B33Y 30/00
See application file for complete search history.

(56) References Cited

U.S. PATENT DOCUMENTS

| | | | |
|---|---|---|---|
| 6,008,281 A | 12/1999 | Yang et al. | |
| 6,363,606 B1 | 4/2002 | Johnson et al. | |
| 6,630,009 B2 | 10/2003 | Moussa et al. | |
| 6,814,926 B2 | 11/2004 | Geving et al. | |
| 7,722,802 B2 | 5/2010 | Pfeifer et al. | |
| 9,126,365 B1 | 9/2015 | Mark et al. | |
| 9,327,448 B2 | 5/2016 | Shah et al. | |
| 9,421,612 B2 | 8/2016 | Fang et al. | |
| 9,512,544 B2 | 12/2016 | Heikkila | |
| 2001/0023754 A1 | 9/2001 | Kinane et al. | |
| 2003/0084752 A1 | 5/2003 | Anderson | |
| 2004/0102561 A1 | 5/2004 | Nakano | |
| 2011/0195264 A1 | 8/2011 | Aravinda | |
| 2015/0034604 A1 | 2/2015 | Subramanian et al. | |
| 2016/0083303 A1 | 3/2016 | Mironets et al. | |
| 2016/0107331 A1 | 4/2016 | Schmidt | |
| 2016/0339518 A1 | 11/2016 | Nardi et al. | |
| 2017/0297106 A1* | 10/2017 | Myerberg | B22F 3/008 |

FOREIGN PATENT DOCUMENTS

| | | |
|---|---|---|
| WO | WO2017/009190 | 1/2017 |
| WO | WO2017/081160 | 5/2017 |
| WO | WO2017123250 | 7/2017 |

OTHER PUBLICATIONS

Tang et al. ("The effects of two gas flow streams with initial temperature and pressure differences in cold spraying nozzle." Surface and Coatings Technology 240 (2014): 86-95.) (Year: 2014).*
WO-2011057615-A1 english translation (Year: 2011).*

* cited by examiner

METHODS AND SYSTEMS FOR 3D PRINTING WITH POWDERS

RELATED APPLICATION

This application claims the benefit of U.S. Provisional Application No. 62/554,257, filed Sep. 5, 2017 which is incorporated herein by reference.

GOVERNMENT INTEREST

This invention was made with government support under Grant No. DE-AR0000420 awarded by the National Department of Energy. The government has certain rights in the invention.

BACKGROUND

Three-dimensional (3D) printing, also known as additive manufacturing, can be used to build parts from a wide variety of materials, including plastics, ceramics, metals, and composites. Techniques for 3D printing ceramics and metals can be roughly categorized into two groups: those that completely melt the build material and those that do not melt the build material. Examples of processes that melt the build material include selective laser melting (SLM), electron beam melting (EBM), and other techniques that directly deposit powder or wire feed into a flame to melt, deposit, and build parts layer by layer. Non-melting techniques include binder jetting and the fused deposition modeling among others.

Binder-jetting of metal or ceramic powder often involves depositing powdered ceramic or metal in sequential layers by a roller or scraper system, and then selectively depositing of liquid binder material by an ink-jet printing technique. The desired three-dimensional green part is formed after removing loose or unbound powder. The green part is then sintered to yield a useful component with desired mechanical properties. The binder can also be removed by immersing in appropriate solvents or exposing to a high temperature, or, in some cases, the binder can be incorporated into the final component. Currently, ExOne and 3D Systems sell commercial binder-jetting 3D printers for use with metals and ceramics.

Fused deposition modeling (FDM) can also be used to 3D print metal or ceramic powders. Solid powder is mixed with a polymeric binder to form a feedstock. The feedstock can be extruded to make a filament that can be wound and stored until use. During the printing process, the filament is guided to a nozzle that is heated to a temperature that softens the binder. The material is essentially extruded and deposited while the filament is continuously fed. The motion of the nozzle and the deposition of the material are controlled by computer software following a path according to the design of the part to be made. This action is repeated layer by layer to build the part in three dimensions. The feedstock (filament) in such systems typically has a very high binder content (40-60 vol %). This binder will be removed prior to the sintering of the parts. Similar with binder-jetting, the printed green part is then sintered to a dense ceramic or metallic component.

SUMMARY

Methods and systems for printing three dimensional articles using dry build material powder can provide effective 3D printing of metal and/or ceramic based materials with high green density. A method of printing a three dimensional article can include spraying a dry build material powder to form a bottom layer of the three dimensional article by spraying a dry build material powder onto a build platform while heating the dry build material powder. The dry build material powder can include metal or ceramic particles mixed with a polymeric binder having a softening point temperature. The dry build material powder can be heated to a temperature above the softening point temperature such that the dry build material powder sticks to the build platform. Subsequent layers can be formed by spraying dry build material powder onto a lower layer while heating the dry build material powder such that the dry build material powder sticks to the lower layer.

A three dimensional printing system can include a supply of a dry build material powder. The dry build material powder can include metal or ceramic particles mixed with a polymeric binder having a softening temperature. The system can also include a spray nozzle and a build platform that are moveable with respect to one another in x, y, and z directions. A carrier gas supply can be connected to the supply of dry build material powder and the spray nozzle to fluidize along a supply conduit and propel the dry build material power out of the spray nozzle. A heater can be positioned to heat the dry build material powder as the dry build material powder is sprayed out of the spray nozzle toward the build platform.

Figure 1:
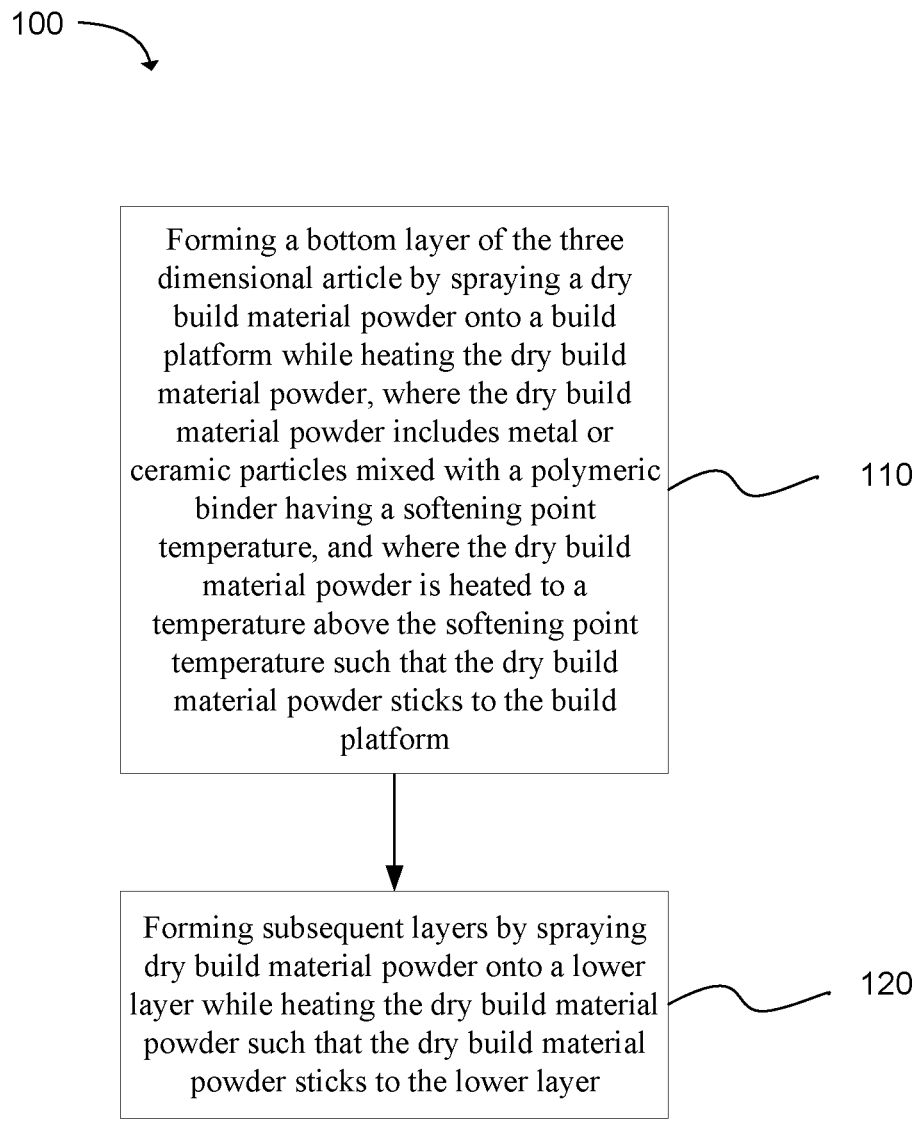
FIG. 1 is a flowchart of an example method of printing a three dimensional article in accordance with the present disclosure.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

DEFINITIONS

In describing and claiming the present invention, the following terminology will be used.

As used herein, "softening point temperature" refers to a temperature at which a polymer becomes softened to the point that particles of the softened polymer will stick and adhere together when the particles collide with previously printed particles or a support surface. Thus, the softening point temperature can be any temperature that allows a surface of the binder to become tacky sufficient to cause agglomeration on a printed article. The softening point temperature can be at least the glass transition temperature, and in some cases the melting temperature of the binder. Regardless, the binder can be heated to at least a temperature at which such softening occurs and which will vary depending on factors such as binder type and heating rates. Accordingly, in some cases the softening can be sufficient to completely melt the binder while in other cases only outer exposed surface regions are melted. In some examples, the dry build material powder described herein can include metal or ceramic particles that are mixed, and in some cases, at least partially coated with a polymer. Layers of a printed part can be formed by spraying the powder and heating the powder particles above the softening point temperature of the polymer. When the heated particles strike the layer below, the softened polymer can stick to the layer below. When the polymer cools again, the powder particles can remain stuck together by the polymeric binder. In this way, layers of the powder can be built up to form a solid printed part.

As used herein, "metal particles" can refer to particles formed of a single metallic element, or an alloy of multiple metallic elements, or in some cases a composite that includes a metallic element and another non-metallic substance.

As used herein, "ceramic particles" refers to particles of a ceramic material, which is an inorganic non-metallic solid such as oxides, nitrides, or carbides. In many cases, ceramic particles can be substantially only ceramic materials. However, in some cases ceramic particles may include a mixture of ceramic materials and a metal or metals (i.e. cermet materials), such as tungsten carbide cobalt (WC—Co), titanium nitride, titanium carbonitride, titanium carbide, and the like mixed with a metal such as, but not limited to, nickel, molybdenum, and cobalt. In other examples, such materials can also be made by using a mixture of a ceramic powder and a metal powder, which can subsequently form a single part by sintering. Furthermore, ceramic particles can also include non-ceramic materials such as, but not limited to, nanoparticles, structural fibers (e.g. carbon fiber, etc), minerals, and the like.

As used herein, "average particle size" refers to a number average particle size unless otherwise stated. The particle size refers to the diameter of spherical particles, or the longest dimension of non-spherical particles. The average particle size can be measured by sieving, SEM, or the like.

As used herein, "spray" refers to the fluidization process of propelling dry build material powder particles entrained in a gas out of a spray nozzle. Although the word "spray" is often associated with liquid droplets, in the context of the present disclosure the dry build material powder is sprayed to build up a 3D printed part. As explained herein, the dry build material powder is a solid, not a liquid, because the metal or ceramic particles in the powder remain solid and the polymeric binder is softened just prior to the point of impact on a build surface or printed article. The term "spray drying" is also used herein to describe a granulation process that can be used to make the dry build material powder. In this context, the material being spray dried is a slurry of metal or ceramic particles, polymeric binder, and solvent. Thus, spray drying involves spraying droplets of this slurry and allowing the solvent to evaporate to create dry flowable granules of metal or ceramic particles in the polymeric binder.

It is noted that, as used in this specification and in the appended claims, the singular forms "a," "an," and "the" include plural referents unless the context clearly dictates otherwise. Thus, for example, reference to "a metal" includes one or more of such materials, and reference to "heating" includes reference to one or more of such steps.

As used herein, the terms "about" and "approximately" are used to provide flexibility, such as to indicate, for example, that a given value in a numerical range endpoint may be "a little above" or "a little below" the endpoint. The degree of flexibility for a particular variable can be readily determined by one skilled in the art based on the context. However, unless otherwise enunciated, the term "about" generally connotes flexibility of less than 2%, and most often less than 1%, and in some cases less than 0.01%.

As used herein, the term "substantially" refers to the complete or nearly complete extent or degree of an action, characteristic, property, state, structure, item, or result. The exact allowable degree of deviation from absolute completeness may in some cases depend on the specific context. However, the nearness of completion will generally be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such lists should be construed as a de facto equivalent of any other member of the same list solely based on their presentation in a common group without indications to the contrary.

Concentrations, amounts, and other numerical data may be presented herein in a range format. It is to be understood that such a range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where, for a specific claim limitation, all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Examples of the Technology

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing a system, or the related devices or methods, individual or separate descriptions are considered applicable to one other, whether or not explicitly discussed in the context of a particular example or embodiment. For example, in discussing a device per se, other device, system, and/or method embodiments are also included in such discussions, and vice versa.

Furthermore, various modifications and combinations can be derived from the present disclosure and illustrations, and as such, the accompanying figures should not be considered limiting.

The present disclosure provides methods and systems for three dimensional (3D) printing using metal or ceramic materials. These methods and systems can form a three dimensional printed part made up of metal or ceramic particles held together by a polymer binder. This can be referred to as a "green" part. The green part can be heated at a debinding temperature to remove the polymer binder and then heated at a sintering temperature to sinter the metal or ceramic particles to form a final, durable metal or ceramic part.

The green part can be formed by a non-melting 3D printing technique. The build material for this 3D printing technique can be a dry powder that includes metal or ceramic particles that are mixed with a polymeric binder. The powder can be fluidized and entrained in a carrier gas and sprayed out of a spray nozzle onto a 3D printing build platform. The powder particles can be heated at the time the particles exit the nozzle to a temperature that is sufficient to soften the polymer binder. The softened binder can then become sticky to allow the powder particles to adhere, either to the build platform if the first layer of the 3D printed part is being formed, or to a lower layer of the 3D printed part to form additional layers. Thus, a 3D printed part can be built, layer-by-layer, by spraying the heated powder particles.

Compared to some 3D techniques that function by melting a polymeric binder, such as fused deposition modelling, the techniques described herein can reduce the total amount of polymeric binder used. Reducing the amount of polymeric binder in green parts can be useful because this can minimize shrinkage and distortion during sintering of the green part. Therefore, the final sintered part produced using the methods described herein can be higher quality compared to parts made using other methods.

Additionally, the dry build material powder described herein can be easier to prepare compared to feedstocks for some other 3D printing methods. The metal or ceramic particles do not need to be completely coated by the polymeric binder. In some examples, the metal or ceramic particles are merely mixed with a sufficient amount of polymeric binder to allow the particles to stick when printed. The build material powder described herein can be prepared by mixing metal or ceramic particles with a polymeric binder and a solvent, and then drying the solvent. Alternatively, the powder can be prepared by compounding metal or ceramic particles with a polymeric binder without a solvent. The particles and binder do not need to be formed into a filament as in fused deposition modelling.

With this description in mind, FIG. 1 is a flowchart of an example method 100 of printing a three dimensional article. The method includes forming 110 a bottom layer of the three dimensional article by spraying a dry build material powder onto a build platform while heating the dry build material powder, wherein the dry build material powder comprises metal or ceramic particles at least partially coated with a polymeric binder having a softening point temperature, and wherein the dry build material powder is heated to a temperature above the softening point temperature such that the dry build material powder sticks to the build platform, and forming 120 subsequent layers by spraying dry build material powder onto a lower layer while heating the dry build material powder such that the dry build material powder sticks to the lower layer.

The methods of printing 3D articles described herein can be performed using a 3D printing system capable of spraying the dry build material powder to form the 3D printed green part. Several types of 3D printing systems have been developed with various methods of moving a print head in three dimensions with respect to the part being printed. For example, some existing fused deposition modelling (FDM) 3D printers include a print head known as a "hot end" that contains an extruder for melting and extruding filament. The hot end can be moved in three dimensions as controlled by a computer in order to precisely model the 3D printed part from melted filament. The hot end may be moved by a combination of motors, belts, gears, and so on, depending on the type of 3D printer.

Regardless of the specific printing system, similar movement and powder spray printing systems can be used with the methods described herein. For example, the dry build material powder can be sprayed from a sprayer that is moveable with respect to the 3D part being printed. In some examples, the sprayer can be on a gantry that can move the sprayer in multiple directions. In a particular example, the sprayer can be moveable in the x, y, and z directions. The 3D printed part can be printed on a stationary build platform by spraying the build material powder onto the build platform. In other examples, the build platform can move in one or more directions. In some cases, the build platform can move forward and backward (i.e., along the y-axis) while the sprayer moves in the left-right (x-axis) and up-down (z-axis) directions. In another example, the sprayer can move in the x-axis and y-axis directions, and the build platform can move in the z-axis direction. Other systems of moving the sprayer can also be used, such as those used in delta 3D printers, polar 3D printers, robotic arm-type 3D printers, and others. Therefore, either or both of the sprayer and build platform can be moveable as long as relative movement between the sprayer and build platform includes all three axes: x, y and z. In yet another alternative, multiple sprayers can be used simultaneously to increase printing speed or provide for deposition of multiple distinct materials. In one example, a dry build material powder can be spray printed from at least one sprayer, while a second sprayer can deposit a different material (e.g. polymer-free particles, polymer particles having no metal or ceramic materials, etc).

Figure 2:
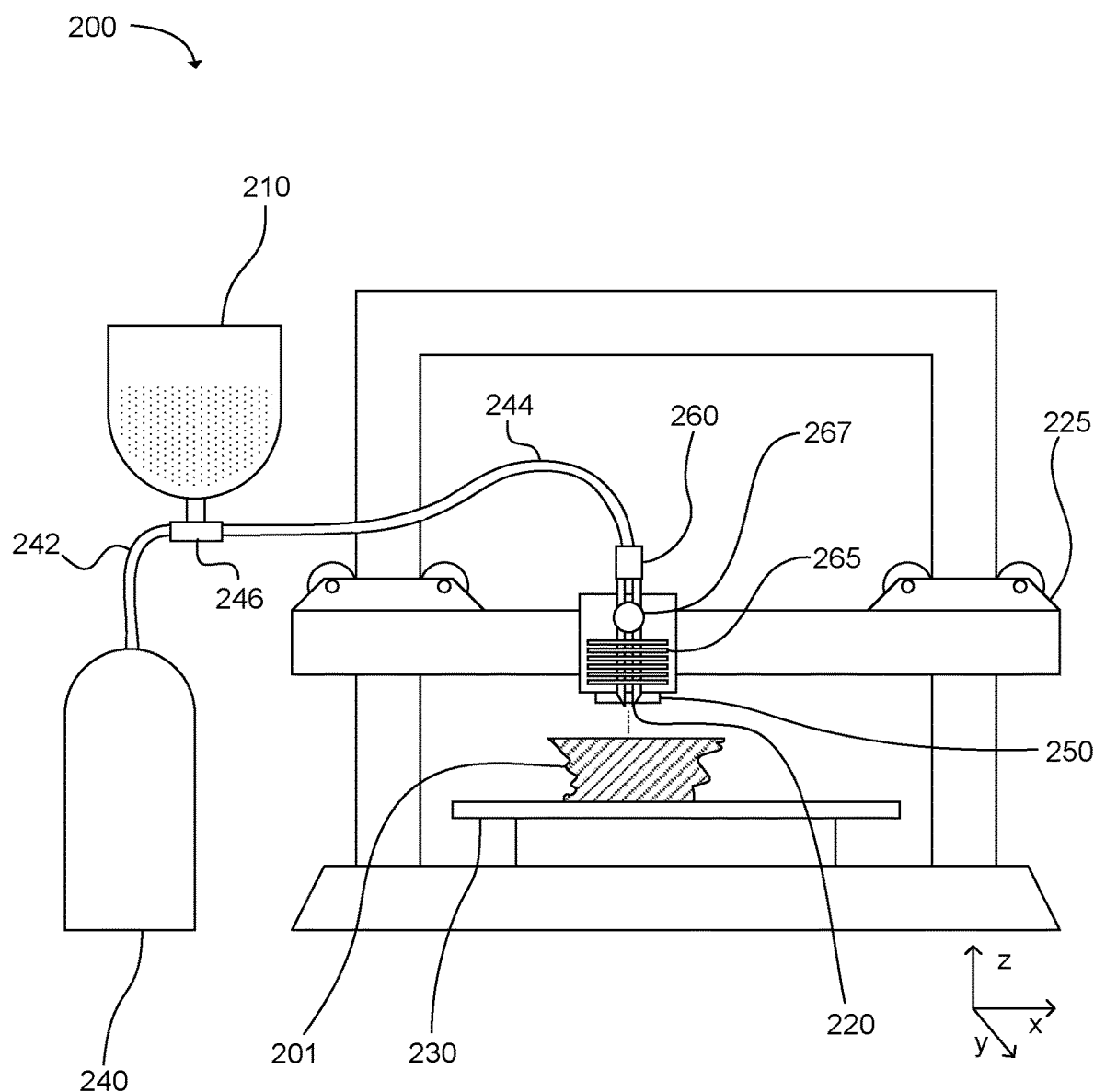
FIG. 2 is a schematic view of an example three dimensional printing system in accordance with the present disclosure.

FIG. 2 shows one example of a three dimensional printing system 200 in accordance with the present technology. The system includes a supply 210 of a dry build material powder. The dry build material powder can include metal or ceramic particles mixed with a polymeric binder having a softening temperature. The system also includes a spray nozzle 220 and a build platform 230, where the spray nozzle and build platform are moveable with respect to one another in x, y, and z directions. In this example, the spray nozzle is moveably mounted on a gantry 225 that can move the spray nozzle in the x-axis and z-axis directions, while the build platform can move in the y-axis direction.

The system also includes a carrier gas supply 240 connected to the supply of dry build material powder and the spray nozzle to fluidize and propel the dry build material powder out of the spray nozzle. In this example, the carrier gas supply is connected to the dry build material powder supply and spray nozzle by flexible hoses 242, 244 via a connecting union 246. The connecting union can optionally include a control valve which is operable to vary flow of powder into the carrier gas flow. A heater 250 is positioned to heat the dry build material powder as the dry build material powder is sprayed out of the spray nozzle toward the build platform. In this example, the heater is a resistive heater that heats the tip of the nozzle so that dry build material powder particles are heated at least to their softening point as the particles travel out of the nozzle. Additionally, the spray nozzle in this example is at the end of a sprayer 260 that includes a heat sink 265. The heat sink can cool the sprayer so that heat from the spray nozzle does is not conducted to the rest of the sprayer to the point that the build material powder softens too soon higher up in the sprayer which can cause agglomeration of the powder and clogging of the sprayer. Thus, the heat sink can help prevent clogging of the spray nozzle due to premature softening of build material particles. Optional cooling fans, cooling fins and the like can also be oriented adjacent the heat sink in order to dissipate heat into surround environment away from a powder flow path within the sprayer.

The sprayer also includes a carrier gas valve 267. The carrier gas valve can open and close to start and stop flow of the carrier gas and dry build material powder to the spray nozzle according to instructions from a corresponding sprayer controller The sprayer controller can include a CPU which is programmed to operate the valve and motion of the prayer based on a given article design. This system can additively print a 3D printed part 201 by spraying build material particles out of the nozzle. The heater softens the polymer binder of the particles such that the particles stick to the surface of the 3D printed part to add more material to the part.

In some examples, a 3D printing system such as the one shown in FIG. 2 can include a controller that can move the spray nozzle and build platform while controlling the heater and flow of carrier gas and dry build material powder to construct a 3D printed part on the build platform. In certain examples, the 3D printing system can include a built-in controller capable of following a set of numerical control instructions such as G-code instructions. In other examples, the 3D printing system can be connected to an external controller such as a personal computer, portable computer (e.g. smartphone, tablet, etc), or specially designed controller dedicated for operation of the printing system. To produce a 3D printed part, the part can first be designed using 3D modelling software such as computer aided (CAD) software. In some examples, a 3D design can be translated into numerical control instructions for the 3D printing system. The translation process can be performed, in some examples, by specialized software such as "slicer" software. Typically, the 3D model can be "sliced" into many horizontal layers, and then instructions can be written for the 3D printing system to form each layer sequentially.

The methods and systems for 3D printing described herein can involve controlling a number of process variables to affect the production of 3D printed parts. In some examples, process variables that can affect the 3D printed parts can include movement speed of the nozzle, movement speed of the build platform, temperature of the build platform, temperature of the heater, temperature of the carrier gas, flow rate of the carrier gas, ratio of dry build material powder to carrier gas, and others. The numerical instructions for the 3D printing system can include instructions to set and/or dynamically change these process variables. Other variables in other examples can include fan speeds for cooling fans directed at the sprayer or at the surface of the 3D printed part, flow rates of cooling fluids for cooling jackets, flow rates of additional carrier gases, power level of alternative heating equipment such as lasers, infrared heaters, or hot air guns, and so on.

A variety of additional variables can affect the 3D printed parts, including build platform surface, nozzle diameter, type of build material and build material particle size, binder content, binder type, type of carrier gas, and so on. These variables may not be easily controlled dynamically, but can be adjusted to optimize the 3D printing process for a particular application.

In some examples, the sprayer used to spray the build material can include a spray nozzle having a constricted opening. The nozzle diameter can generally be from 0.05 mm to 1.0 mm in some examples, and in most cases from 0.1 mm to 0.3 mm. The material of the nozzle can be any material which can withstand mechanical abrasion of powder particles during for a desired useful life. Although metals can be particularly desirable, non-metal materials such as, but not limited to, ceramics, compositionally graded materials, composites, and the like. Non-limiting examples of suitable metal can include steel, stainless steel, brass, aluminum, tungsten, titanium, carbides thereof including tungsten carbide, aluminum carbide, etc, oxides thereof include aluminum oxide, etc, alloys thereof, or others. Non-limiting examples of suitable ceramics can include cubic boron nitride, and the like. Nozzle exit surfaces can optionally be surface hardened (e.g. carburizing, nitriding, etc) in order to increase useful life of the nozzle. In certain examples the nozzle can be heated such that the material of the nozzle can have a high melting point sufficient to withstand the heat. In other examples, the nozzle can be made from or include a polymeric material that has a melting temperature high enough to withstand the temperature encountered at the nozzle during printing. In a particular example, the build material powder can be heated after exiting the nozzle by a non-contact heating method such as laser or infrared, and the nozzle can remain relatively cool during printing. In another alternative, the nozzle can be replaceable allowing a user to replace worn nozzles and/or have multiple different nozzle sizes to allow for differing powder size, differing print resolution, etc.

In further examples, the sprayer can include a sprayer cooler to prevent the sprayer from heating up to a temperature that would soften the build material particles too soon. In certain examples, the sprayer cooler can include a heat sink, a fan, a cooling jacket, or combination thereof. A cooling jacket around the sprayer can cool the sprayer by circulating air, water, or another cooling fluid through the jacket. In another particular example, a heat sink can be attached to the sprayer and a fan can be attached and positioned to blow air through or across the heat sink. Similarly, a heat sink can generally include cooling fins which create a high surface area to allow increased radiation and dissipation of heat.

In further examples, the sprayer can include a valve for changing the flow of carrier gas and dry build material powder through the sprayer. For example, the valve can be closed to stop the flow of carrier gas and build material, or opened to allow the flow. In certain examples, the valve can provide fine control over the flow rate of carrier gas and build material powder. The valve can be electronically controllable so that the 3D printing system controller can start and stop the flow of carrier gas and build material when desired to form the 3D printed part. In certain examples, the valve can be activated using a solenoid, servo, stepper motor, or another electric actuator. Such valves can generally allow for very fast actuation times (e.g. less than 0.5 second and often less than about 500 microseconds).

In alternative examples, a valve for controlling the carrier gas can be located in another part of the system, such as on the carrier gas supply or anywhere along the line connecting the carrier gas supply to the nozzle. In a particular example, the carrier gas valve can be connected between the carrier gas supply and the supply of dry build material powder.

The carrier gas can be supplied by a carrier gas supply such as a compressed gas tank or air compressor. In certain examples, the carrier gas can be an inert gas such as nitrogen or argon. These gases can be supplied by a gas tank such as a gas cylinder. In some examples, the carrier gas supply can provide a consistent pressure using a pressure regulator. In other examples, air can be used as the carrier gas. Compressed air can be supplied by a compressor, by a pneumatic compressed air line, and so on. The pressure of the carrier gas can be controlled at the carrier gas supply by the compressor or pressure regulator. The pressure may also be controlled using the valve described above that can be located in the sprayer, at the carrier gas supply, or along the line connecting the carrier gas supply to the sprayer. In a particular example, the carrier gas valve can be connected between the carrier gas supply and the supply of dry build material powder. In some examples, the pressure of the carrier gas used during printing can be from 0.1 psi to 100 psi. The flow rate of the carrier gas can also be controlled. In certain examples, the flow rate of carrier gas can be from 0.1 ml/min to 10 liter/min. Gas pressure and flow rates can be varied considerably depending on the specific materials.

In further examples, the carrier gas source can be connected to a powder fluidizer to mix the dry build material powder with the carrier gas. In certain examples, a supply of dry build material can be connected to the powder fluidizer or the powder fluidizer can be the same unit or a part of the same unit where the dry build material powder is stored. In one example, the carrier gas can flow from the carrier gas supply to the powder fluidizer, where build material particles are mixed with the carrier gas at a flow rate sufficient to fluidize the powder. The fluidized build material particles and carrier gas can then flow to the spray nozzle where the build material particles are sprayed out to print a 3D printed part. In an alternate example, the powder fluidizer can be integrated with the sprayer. In this example, carrier gas can flow from the carrier gas source to the sprayer and the carrier gas can mix with build material powder in the powder fluidizer that is a part of the sprayer. In a further example, the supply of dry build material powder can also be integrated with the sprayer and powder fluidizer so that all these components are in a single unit.

Figure 3:
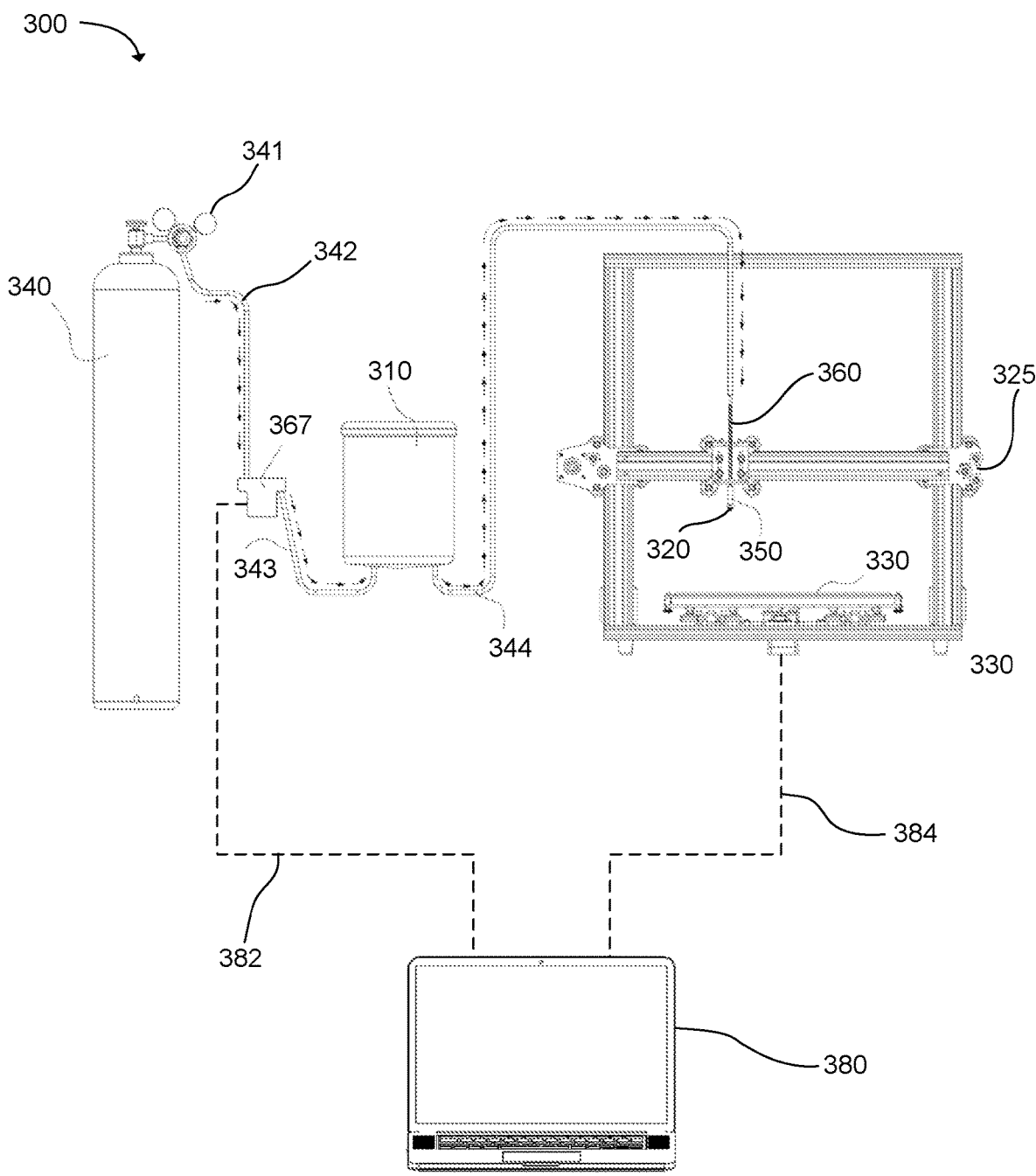
FIG. 3 is a schematic view of another example three dimensional printing system in accordance with the present disclosure.

FIG. 3 is a schematic of another example three dimensional printing system 300 in accordance with the present disclosure. This example includes a powder fluidizer 310 containing a supply of dry build material powder. A carrier gas tank 340 with a pressure regulator 341 is connected to a solenoid valve 367 by a hose 342. The solenoid valve is connected to the powder fluidizer by a second hose 343. The powder fluidizer is then connected to a sprayer 360 by another hose 344. The sprayer is on a gantry 325 that can move in the x-axis and z-axis directions. The system includes a build platform 330 that can move in the y-axis direction. The sprayer includes a spray nozzle 320 and heater 350 to spray softened build material particles. A personal computer 380 is connected to the gantry and the solenoid valve through electrical connections 382, 384. In this example, the personal computer can control the movements of the gantry and build platform and turn the solenoid valve on and off. While the system is printing a 3D printed part, the sprayer can move over a spot on the build platform where build material is to be sprayed, and the solenoid valve can open to allow carrier gas and build material powder to be sprayed from the sprayer. Such spraying can be performed as a continuous flow of fluidized powder or in multiple discrete bursts ejected in series. Most often, the spraying can involve periods of continuous flow interrupted by pauses while the sprayer adjusts location relative to the 3D article or to allow formation of a void within the 3D article. For example, any time the sprayer moves over an area where build material is not desired, the solenoid valve can close. Thus, the sprayer can be ejecting material either while moving or while stationary relative to the 3D article and build platform.

Figure 4:
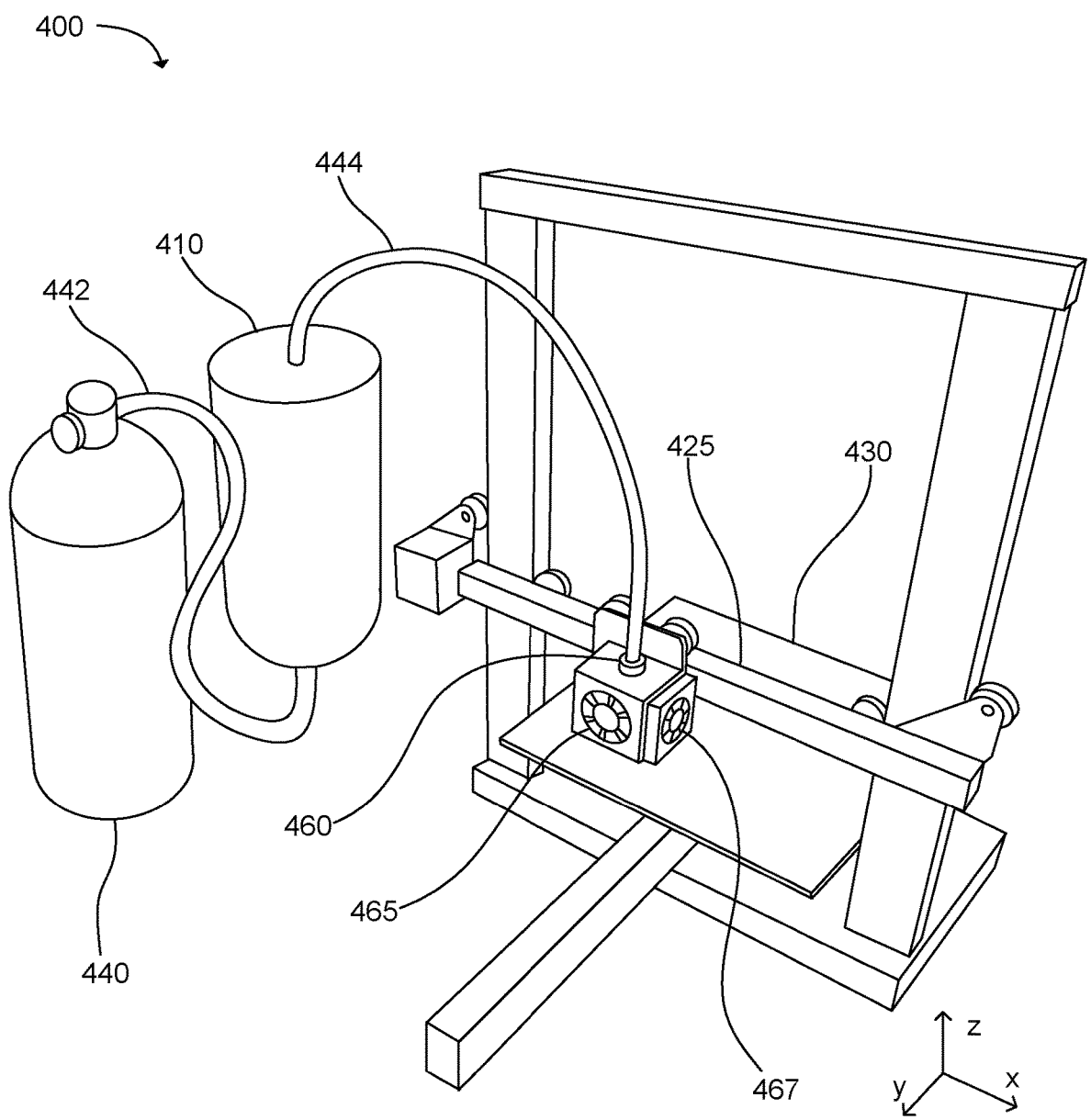
FIG. 4 is a perspective view of another example three dimensional printing system in accordance with the present disclosure.

FIG. 4 shows yet another example three dimensional printing system 400 in accordance with the present disclosure. This system includes a powder fluidizer 410 containing a supply of dry build material powder. A carrier gas tank 440 is connected to the powder fluidizer by a hose 442, and the powder fluidizer is connected to a sprayer 460 by another hose 444. The sprayer is mounted on a gantry 425 that can move in the x-axis and z-axis directions. The system includes a build platform 430 that can also move in the y-axis direction. Similar to the example in FIG. 2, this system also includes a nozzle on the sprayer and a heater positioned at the nozzle (not shown due to viewing angle in FIG. 4). In this example, the sprayer is cooled by a fan 465 that blows ambient air across the sprayer. A second fan 467 is also included. The second fan can optionally include a fan shroud shaped to direct air at the surface of the 3D printed part to cool the part. Accordingly, in this and some other examples the system can include a fan configured to cool the 3D printed part surface so as to minimize melting and/or internal movement of printed materials.

The ratio of dry build material powder to carrier gas can be controlled to adjust the rate at which build material is deposited on the 3D printed part. More particularly, in some examples the flow rate of dry build material particles can be controlled independently of the flow rate of carrier gas. The flow rate of the dry build material particles can be controlled such that the particles are dispensed from the spray nozzle almost one-by-one. The flow rate can also be increased so that many particles are dispensed quickly to increase the build rate of the 3D printed part. In some examples, this can be accomplished by using two carrier gases. A first carrier gas can be used to fluidize the dry build material powder and transport the powder to the sprayer. A second carrier gas supply can be connected to the sprayer with a controllable valve to adjust the relative amounts of the second carrier with the mixture of the first carrier gas and the build material. By changing the flow rates of the first and second carrier gas, the ratio of build material to carrier gas can be controlled. Regardless, as a general guideline, the ratio of dry build material powder to carrier gas can be sufficient to maintain flowability of the dry build material powder. In some cases the dry build material powder can range from about 1% by volume to 30% by volume of the fluidized print materials.

As mentioned above, the dry build material powder can be heated to a temperature above the softening point of the polymeric binder in the powder when the powder is sprayed from the spray nozzle. In some cases, the powder can include granules of multiple metal or ceramic particles held together by the polymeric binder, and the heating can soften the binder that is binding the fine particles within each individual granule. Heating can be accomplished using a variety of heaters, such as laser heating devices, infrared heating devices, hot air guns with controlled air flow path, a nozzle cap including a resistive heater, a heated nozzle tip, heated carrier gases, heated build platform, or combinations thereof. Heating can be provided around the outside surface of the spray gun nozzle, incorporated within the nozzle, or directed separately at the exit of the nozzle, or on the build "pool" where the powder is deposited. Thus, in some cases, the heating may not be sufficient to melt the powder particles, but rather to merely soften the polymer binder portion (e.g. reach the glass transition temperature and/or merely melt outermost exposed layers of the binder). Although softening point temperatures can vary considerably depending on the binder, as a general guideline such temperatures can range from 30° C. to 200° C. and in some cases 50° C. to 120° C.

Alternatively, multiple sprayer nozzles and/or sprayer assemblies can be used to deposit materials simultaneously or in series. In some cases, such multiple nozzles can dispense various dry build material powder having different compositions. However, in other cases, one of more nozzles can also spray dry metal or ceramic particles. Similarly, one or more nozzles can be configured to deposit a polymer particle material (e.g. being free of metal or ceramic material).

Generally, the heat can be applied to the dry build material powder after the powder leaves the nozzle, at the same time when the powder is leaving the nozzle, or just before the powder leaves the nozzle. However, in some examples the powder can remain at a temperature below the softening point temperature up until about the time the powder leaves the nozzle. If the powder becomes softened more than slightly before exiting the nozzle, then the softened powder can potentially clog the nozzle. Thus, the 3D printing systems described herein can often include a heater outside or at the nozzle. The dry build material powder can remain flowable until the powder is ejected from the nozzle. In some cases, the heater can include a pre-heat portion which heats the fluidized powder near the desired temperature while a final heater introduces sufficient heat to cause the stated softening of the polymeric binder.

Figure 5:
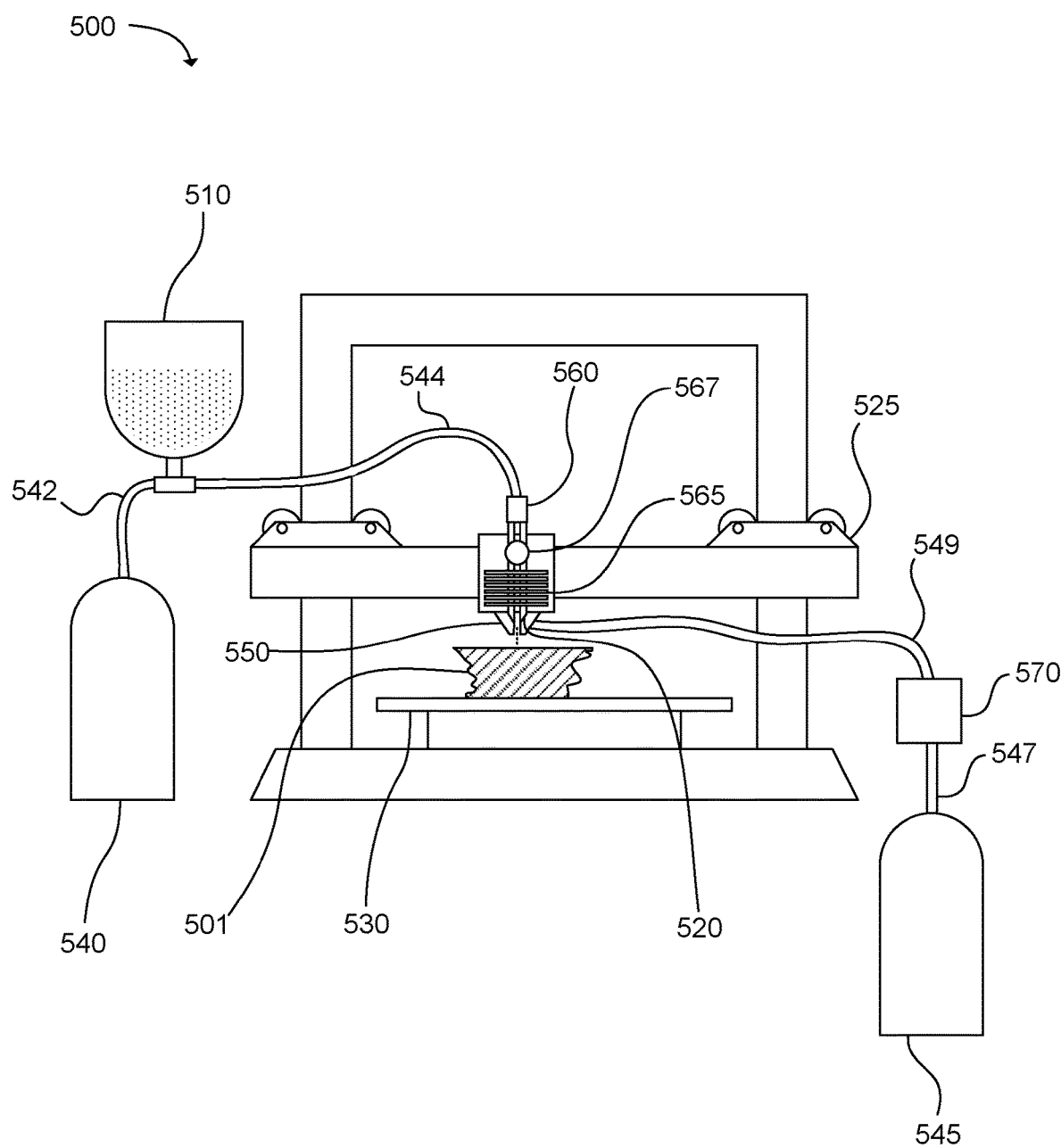
FIG. 5 is a schematic view of yet another example three dimensional printing system in accordance with the present disclosure.

In some examples, a 3D printing system can include multiple carrier gas supplies. In certain examples, multiple carrier gas supplies can be used to adjust the ratio of build material to carrier gas as mentioned above. In other examples, a heated carrier gas can be introduced at or near the spray nozzle to soften the polymer binder of the build material particles. FIG. 5 shows an example three dimensional printing system 500 that includes a first carrier supply 540 and a second carrier gas supply 545. The first carrier gas supply is connected to the dry build material powder supply 510 and the sprayer 560 through hoses 542 and 544. The second carrier gas supply is connected to a gas heater 570 and a nozzle cap 550 over the spray nozzle 520 through hoses 547 and 549. This example also includes a gantry 525 for moving the sprayer and a moveable build platform 530. A valve 567 controls the flow of the first carrier gas with fluidized build material powder, and a heat sink 565 cools the top portion of the sprayer. This system can print a 3D printed part 501 by sprayer build material particles from the nozzle. When the particles pass through the nozzle, the particles and first carrier gas mix with the heated second carrier gas and the polymer binder of the particles softens to allow the particles to stick to the surface of the 3D printed part.

In some examples, the carrier gas supplies can be compressed gas tanks as shown in FIG. 5. In other examples, the carrier gas supplies can be air compressors, pneumatic pressurized air lines, or combinations thereof. In still further examples, a single gas tank or compressor can have two separate lines splitting off to provide two separate carrier gas supply lines. In an example, one of the lines can connect to a powder fluidizer to supply carrier gas mixed with build material powder, while the other line can supply pure carrier gas to the sprayer. The flow rates from each of these two lines can be adjusted to control the ratio of build material to carrier gas sprayed from the sprayer. Alternatively or additionally, the line with pure carrier gas can connect to a heater to supply heated carrier gas similar to the heated carrier gas line in FIG. 5.

For a variety of reasons, some portion of the dry build material powder may not stick to the 3D printed part being printed. For example, some particles of build material can bounce off the 3D printed part instead of sticking, or some particles can miss the part due to imprecision of the sprayer, excessive deposition flow rates, and so on. Although such overspray can be discarded, in order to conserve the build material, in some examples the system can include a collection mechanism for these "overspray" particles. For example, the system can include a collection below the build platform to catch particles that do not stick to the 3D printed part. In another example, a vacuum suction system can be used to collect stray particles. The collection system can be located near the build platform to catch the stray particles.

The build platform can include a surface designed to adhere to the first layer of a 3D printed part so that the 3D printed part can remain in a stable position on the build platform surface. In various examples, the build platform can have a surface of metal, glass, BuildTak™ surfaces (Ideal Jacobs Corp), polyetherimide, Kapton® polymide (DuPont), silicon, Garolite® laminate sheet (McMaster-Carr), or others. In some examples, an adhesion aid can be applied to the build platform such as a spread or spray-on adhesive, adhesive textured tape, or others. In further examples, the build platform can be heated. Heat can be applied by resistive heaters within and/or adjacent the build platform. In some cases, a temperature sensor can be located on the build platform to allow the temperature of the build platform to be precisely controlled by adjusting power to the heaters.

The dry build material powder used with the methods and systems described herein can include particles of metal or ceramic materials. Especially, refractory metals and ceramics typically have high melting points, and therefore are not suitable for 3D printing processes that involve complete melting of the build material. Accordingly, the 3D printing systems and methods described herein do not melt the metal or ceramic particles themselves during printing of the 3D article. Instead, the metal or ceramic particles are mixed with a polymeric binder. The polymeric binder can have a softening point temperature at which the polymeric binder becomes soft and sticky, i.e. with or without fully melting the binder coating. The systems and methods described herein involve spraying these polymer mixed particles while heating the particles to soften the polymeric binder as the particles exit the sprayer and are deposited on a workpiece. When one of the particles contacts either the build platform of the 3D printing system or an already-formed layer of a 3D printed part, the softened polymeric bind can stick to the surface. In some cases, the softened polymer can "splash" when the particle lands, which can increase the surface area of the region where the softened polymer sticks to the layer below it. This can strengthen the bond between layers of the 3D printed part. Additionally, the powder particles can be sprayed at a sufficiently high speed so that the particles can penetrate slightly and are embedded into the surface of the lower layer of the 3D printed part, which can also strengthen the part and increase the density of the 3D printed part.

In some examples, the dry build material powder can contain more metal or ceramic than polymeric binder, by volume. In one example, the powder can include the polymeric binder in an amount less than 50% by volume. In another example, the powder can include the polymeric binder in an amount from 1% to 30% by volume. In still further examples, the powder can include the polymeric binder in an amount from 5% to 20% by volume. Reducing the amount of polymeric binder can lead to an increase in the density of the green body 3D printed part when the part is debinded before sintering. The denser the green body is, the easier it can be to sinter the green body into a densified sintered part without significant shrinkage and/or deformation.

The metal used in the dry build material powder can be a pure metallic element or an alloy of multiple metallic elements. In various examples, the metal can include refractory metals and precious metals such as tungsten, molybdenum, niobium, vanadium, tantalum, titanium, zirconium, hafnium, thorium. The method can also be used for printing more common transition metals such as Fe, Ni, Co, Al, Cr, or an alloy thereof. Ceramic particles used in the dry build material powder can include silica, alumina, zirconia, yttrium cubic zirconia, magnesia, silicon carbide, tungsten carbide, or a combination thereof. In some cases, a mixture of metallic and ceramic materials can be used. In certain examples, a metal and a ceramic can be combined in a single powder particle of the dry build material powder. In other examples, the dry build material can include particles of metal and separate particles of ceramic.

In further examples, the polymeric binder used in the dry build material powder can include any polymer that is capable of softening at a softening point temperature and sticking to lower layers of a 3D printed part made of the same polymeric binder coated particles. In specific examples, the polymeric binder can include paraffin wax, polyvinyl alcohol (PVA), polyethylene glycol (PEG), polyvinyl butyral (PVB), polyvinylpyrrolidone (PVP), poly(methyl methacrylate) (PMMA), micro-crystalline wax, or a mixture thereof.

The powder can be prepared by mixing metal or ceramic particles with the polymeric binder. In some cases, the binder may coat the metal or ceramic particles, although binder content can be merely sufficient to achieve desired adherence upon deposition. In some examples, the powder can be prepared by ball milling a metal or ceramic powder in a solvent containing an appropriate amount of polymeric binder. The amount of binder can be sufficient to mix the powder material at a sufficient binder content and homogeneity to allow agglomeration upon printing. Thus in some cases the powder particles can be fully coated, in other cases the coating may only partially cover the powder particles or even merely adhere to particles sufficient to cause adherence or agglomeration upon printing. As a general guideline, the binder can cover at least 20% of particle surfaces, and in other cases at least 50% of the particle surfaces upon drying. The milling can be conducted for a period of time from a few minutes to 24 hours, or longer, until a desired particle size is reached. The reduction of the particle sizes and the mixing of the powder with the binder can also be accomplished by other means. For example, binder and powder can be mixed in the absence of a solvent using a blender such a sigma blender. In some such cases, the binder and metal and/or ceramic particles can be homogeneously mixed while physically separate and not adhered to one another.

In some examples, the dry build material powder can be made up of individual metal or ceramic particles that are individually coated with the polymeric binder. Alternatively, the metal and/or ceramic particles can be physically mixed with dry binder particles without adhesion between the particles. In other examples, the powder can be made up of agglomerates of several metal or ceramic particles held together by the polymeric binder. In a particular example, the metal or ceramic and the polymeric binder can be granulated to form granules made up of multiple metal and ceramic particles held together by the polymeric binder. Mixtures of metal and ceramic particles can also be granulated to make individual granules that contain both metal and ceramic materials. Spray drying is one method that can be used to prepare dried granules. In this process, a mixture of metal or ceramic particles with polymeric binder and solvent can be spray dried to form nearly spherical dry granules. The solvent can evaporate during the drying process. The granules can be screened to a certain size range, such as −325+625 mesh or −100+400 mesh, for example. The granules can also be spherical or nearly spherical. In some cases, the granules can have an aspect ratio of 1 to 2, and in some cases 1 to 1.2.

Generally, the dry build material powder can have an average particle size from 1 micrometer to 150 micrometers. In some cases the powder can be made up of individual metal or ceramic particles mixed with polymeric binder. These examples can have a smaller particle size range, such as from 5 nm to 30 micrometers, and often to less than 10 micrometers. In other examples, the powder can be made up of granules containing multiple metal and/or ceramic particles. These examples can have a larger particle size range, such as from 10 micrometers to 150 micrometers, from 30 micrometers to 100 micrometers, and in some cases from 20 to 50 micrometers. In this manner, granules can be used to spray print extremely fine metal and/or ceramic powders (e.g. 5 nm to 10 µm, and sometimes less than 5 µm) which can be difficult to spray print as a fine powder.

As mentioned above, the polymeric binder that is mixed with and in some cases at least partially coats the particles or granules of metal or ceramic can allow the particles to stick together during the 3D printing process. Thus, a 3D printed part produced using the processes and systems described herein can be made up of many particles of metal or ceramic held together with the polymeric binder. After the 3D part is printed, the part can then be debinded and sintered. Debinding can remove the polymeric binder from the part in preparation for sintering the metal or ceramic particles together. Debinding and sintering can sometimes be performed together by heating the part to a single temperature sufficient to sinter the part. For example, debinding and sintering can be performed in a single furnace. In some cases, this can be useful when the part includes easily-oxidized metals such as titanium. Performing debinding and sintering together can minimize the exposure of the part to oxygen until after sintering is complete. However, in other examples, the debinding and sintering can be separate steps.

Debinding can be performed at a temperature sufficient to remove the polymeric binder. Depending the on the binder used, the debinding temperature can be from 50° C. to 400° C., in some examples. In other examples, the debinding temperature can be from 150° C. to 350° C. The part can be held at the debinding temperature for a period of time sufficient to remove the polymeric binder. In some examples, the debinding time can be from 1 hour to 100 hours. The debinding can also proceed until a predetermined amount of binder is removed. For example, debinding can proceed until at least 90% of the binder has been removed, and in some cases until substantially all of the binder is removed.

The debinded part can then be sintered by holding the part at a sintering temperature for a sufficient time to reach a desired level of densification of the part. In some examples, the sintering temperature can be from 700° C. to 2000° C. In further examples, the sintering temperature can be from 900° C. to 1000° C., and in some cases 1500° C. to 1800° C. In further examples, the part can be held at the sintering temperature for a sintering time from 1 second to 100 hours. In still further examples, the sintering time can be less than 24 hours. In certain examples, the sintering time can be from 30 minutes to 1 hour. The part can be held under pressure in some examples. In some examples, the part can be sintered to a final densification of 95% to 100%, 97% to 100%, or 98% to 99%. Of course, these parameters can be varied considerably depending on the specific materials.

After sintering, the part can be ready for use or the part can undergo post-processing such as heat treatments to adjust the microstructure and mechanical properties of the part, surface hardening, or machining to correct dimensional issues or surface finish of the part.

Figure 6:
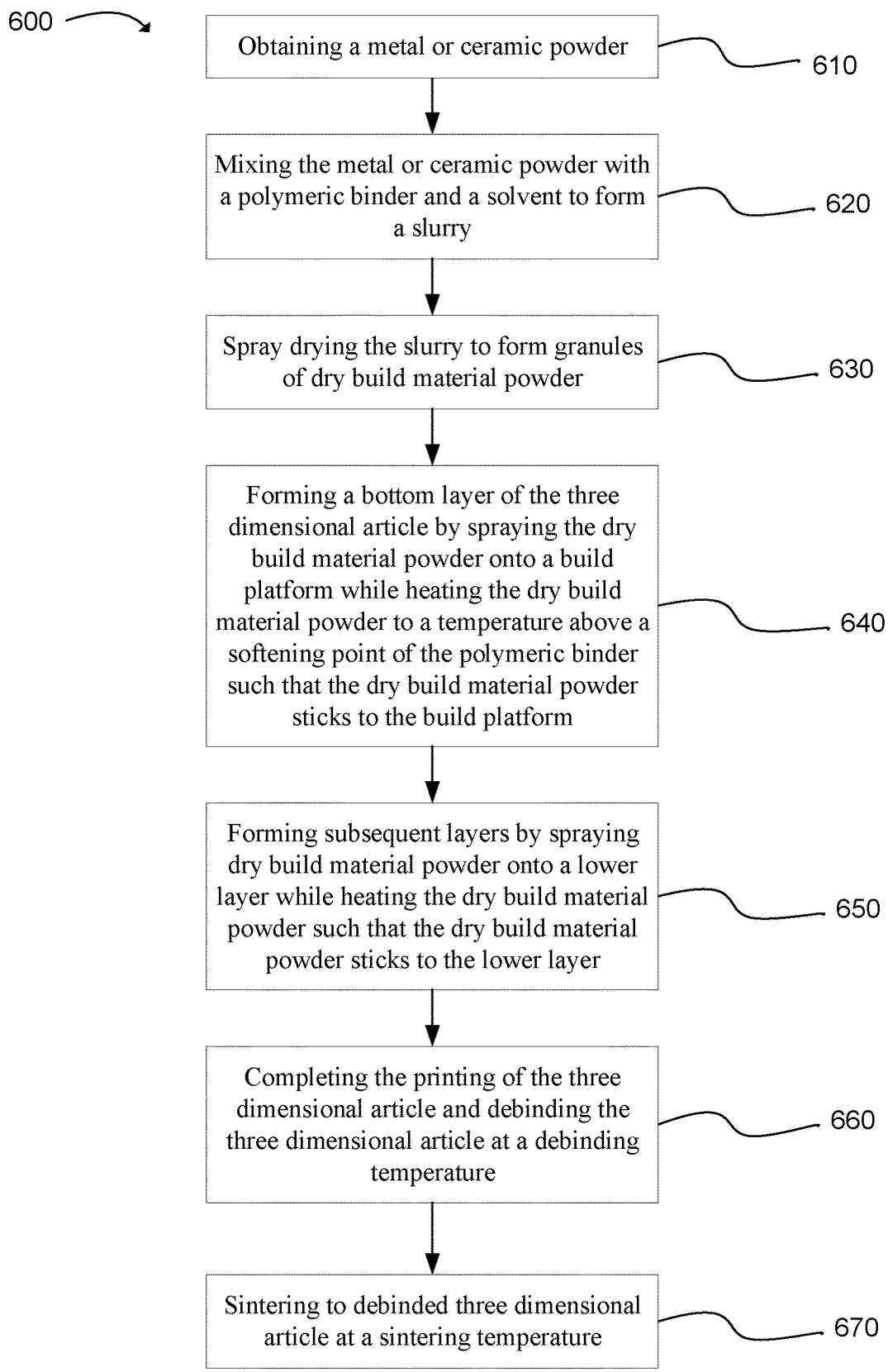
FIG. 6 is a flowchart of another example method of printing a three dimensional article in accordance with the present disclosure.

With the above description in mind, the present disclosure extends to methods of making 3D printed parts that broadly encompass the processes of making the dry build material powder as described above, printing the part, and debinding, sintering, and post-processing the part as described above. FIG. 6 is a flowchart illustrating another example method 600 of printing a three dimensional article. This method includes: obtaining 610 a metal or ceramic powder; mixing 620 the metal or ceramic powder with a polymeric binder and a solvent to form a slurry; spray drying 630 the slurry to form granules of dry build material powder; forming 640 a bottom layer of the three dimensional article by spraying the dry build material powder onto a build platform while heating the dry build material powder to a temperature above a softening point of the polymeric binder such that the dry build material powder sticks to the build platform; forming 650 subsequent layers by spraying dry build material powder onto a lower layer while heating the dry build material powder such that the dry build material powder sticks to the lower layer; completing 660 the printing of the three dimensional article and debinding the three dimensional article at a debinding temperature; and sintering 670 to debinded three dimensional article at a sintering temperature.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A three dimensional printing system, comprising:
   a supply of a dry build material powder comprising metal or ceramic particles mixed with a polymeric binder having a softening temperature;
   a spray nozzle;
   a build platform, wherein the spray nozzle and the build platform are moveable with respect to one another in x, y, and z directions;
   a carrier gas supply connected to the supply of dry build material powder and the spray nozzle to fluidize the dry build material powder and propel the fluidized dry build material powder out of the spray nozzle; and
   a heater positioned to heat the fluidized dry build material powder as the fluidized dry build material powder is sprayed out of the spray nozzle toward the build platform.

2. The system of claim 1, wherein the carrier gas is a non-oxidizing gas.

3. The system of claim 1, wherein the carrier gas is air, argon, or nitrogen.

4. The system of claim 1, wherein the heater comprises a heated nozzle tip, heated nozzle cap, heated build platform, hot air gun, laser, infrared heater, or combinations thereof.

5. The system of claim 1, further comprising a second carrier gas supply connected to the spray nozzle such that the second carrier gas mixes with the first carrier gas and fluidized dry build material powder as the fluidized dry build material powder exits the spray nozzle, and wherein the heater is positioned to heat the second carrier gas.

6. The system of claim 1, wherein the spray nozzle has an opening diameter of 0.1 mm to 1 mm.

7. The system of claim 1, wherein the spray nozzle is on a sprayer which comprises a cooler including a fan, heat sink, cooling jacket, or combination thereof.

8. The system of claim 1, wherein the spray nozzle is on a sprayer and the sprayer comprises a carrier gas valve to start and stop flow of the carrier gas and dry build material powder to the spray nozzle.

9. The system of claim 1, further comprising a carrier gas valve connected between the carrier gas supply and the supply of dry build material powder to start and stop flow of the carrier gas and dry build material powder to the spray nozzle.

10. The system of claim 1, further comprising a powder fluidizer connected to the carrier gas supply and to the supply of dry build material powder to mix the dry build material powder with the carrier gas.

* * * * *